(12) United States Patent
Hasegawa

(10) Patent No.: US 12,304,491 B2
(45) Date of Patent: May 20, 2025

(54) VEHICLE CONTROL SYSTEM AND VEHICLE CONTROL DEVICE

(71) Applicant: DENSO CORPORATION, Kariya (JP)

(72) Inventor: Kosuke Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 571 days.

(21) Appl. No.: 17/151,900

(22) Filed: Jan. 19, 2021

(65) Prior Publication Data

US 2021/0139033 A1    May 13, 2021

Related U.S. Application Data

(63) Continuation of application No. PCT/JP2019/028509, filed on Jul. 19, 2019.

(30) Foreign Application Priority Data

Jul. 23, 2018  (JP) ................. 2018-137826

(51) Int. Cl.
  *B60W 30/182*  (2020.01)
  *B60W 10/18*   (2012.01)
  *B60W 10/20*   (2006.01)
  *B60W 50/02*   (2012.01)
  *B60W 50/00*   (2006.01)

(52) U.S. Cl.
  CPC ........ *B60W 30/182* (2013.01); *B60W 10/182* (2013.01); *B60W 10/20* (2013.01); *B60W 50/0205* (2013.01); *B60W 2050/007* (2013.01); *B60W 2540/26* (2013.01); *B60W 2710/18* (2013.01)

(58) Field of Classification Search
  CPC .. B60W 30/182; B60W 10/182; B60W 10/20; B60W 50/0205; B60W 2050/007; B60W 2540/26; B60W 2710/18
  See application file for complete search history.

(56) References Cited

U.S. PATENT DOCUMENTS

| | | | |
|---|---|---|---|
| 2016/0368491 A1 | 12/2016 | Hauler et al. | |
| 2019/0219411 A1* | 7/2019 | Christen | G01C 21/343 |
| 2019/0278278 A1* | 9/2019 | Yasuda | B60W 30/085 |
| 2019/0361451 A1* | 11/2019 | Wilson | G08G 1/205 |
| 2019/0389457 A1 | 12/2019 | Mielenz | |
| 2022/0169287 A1* | 6/2022 | Beaurepaire | G01C 21/3461 |
| 2023/0205202 A1* | 6/2023 | Poeppel | G06N 3/09 |
| | | | 701/2 |

FOREIGN PATENT DOCUMENTS

| | | |
|---|---|---|
| DE | 102012014717 A1 | 1/2014 |
| DE | 102016224157 A1 | 6/2018 |
| JP | 2015161977 A | 9/2015 |
| JP | 2016525038 A | 8/2016 |
| JP | 2016192028 A | 11/2016 |

* cited by examiner

*Primary Examiner* — Jason Holloway
(74) *Attorney, Agent, or Firm* — Harness, Dickey & Pierce, P.L.C.

(57) ABSTRACT

A vehicle control system includes a vehicle control device and a center device. When inappropriate information is received, the vehicle control device is configured to set a second stop position for stopping an autonomous driving vehicle as a target vehicle. The vehicle control device is configured to transmit at least position information of the target vehicle to the center device and acquire a first stop position.

12 Claims, 4 Drawing Sheets

| | STOP POSITION | RESCUE METHOD | DIALOGUE METHOD WITH PASSENGER |
|---|---|---|---|
| ADULT NOT REQUIRING CARE | TEMPORAL INTERMEDIATE POINT BETWEEN POINT OF SUBJECT VEHICLE AND WAIT POINT FOR AUTONOMOUS DRIVING VEHICLE | RELIEF AUTONOMOUS DRIVING VEHICLE MOVE TO STOP LOCATION, AND PASSENGER TRANSFER TO RELIEF VEHICLE [LEVEL 2] | AUTOMATIC VOICE |
| SMALL CHILD | TEMPORAL INTERMEDIATE POINT AMONG POINT OF SUBJECT VEHICLE, POINT OF CAREGIVER AND WAIT POINT FOR AUTONOMOUS DRIVING VEHICLE | CAREGIVER(*) AND RELIEF AUTONOMOUS DRIVING VEHICLE MOVE TO STOP LOCATION, AND PASSENGER TRANSFER TO RELIEF VEHICLE WITH ASSISTANCE OF CAREGIVER [LEVEL 3] | OPERATOR |
| PERSON REQUIRING CARE | POINT HAVING SPACE FOR ASSISTANCE FOR EXAMPLE, PARKING OF REST AREA, NEXT BUS STOP IF SUBJECT VEHICLE IS UNMANNED BUS | MULTIPLE CAREGIVERS(*) AND RELIEF AUTONOMOUS DRIVING VEHICLE MOVE TO STOP LOCATION, AND PASSENGER TRANSFER TO RELIEF VEHICLE WITH ASSISTANCE OF CAREGIVERS [LEVEL 4] | OPERATOR |
| NO PASSENGER | CLOSE TO PUBLIC TRANSPORTATION (FOR EXAMPLE, STATION) SO THAT DRIVER CAN MOVE TO PARK LOCATION | DRIVER MOVE TO STOP LOCATION, AND PICK UP SUBJECT VEHICLE BY MANUAL DRIVING [LEVEL 1] | UNNECESSARY |

※ ALSO SERVE AS DRIVER FOR PICKING UP SUBJECT VEHICLE BY MANUAL DRIVING

FIG. 4

| | STOP POSITION | RESCUE METHOD | DIALOGUE METHOD WITH PASSENGER |
|---|---|---|---|
| ADULT NOT REQUIRING CARE | TEMPORAL INTERMEDIATE POINT BETWEEN POINT OF SUBJECT VEHICLE AND WAIT POINT FOR AUTONOMOUS DRIVING VEHICLE | RELIEF AUTONOMOUS DRIVING VEHICLE MOVE TO STOP LOCATION, AND PASSENGER TRANSFER TO RELIEF VEHICLE [LEVEL 2] | AUTOMATIC VOICE |
| SMALL CHILD | TEMPORAL INTERMEDIATE POINT AMONG POINT OF SUBJECT VEHICLE, POINT OF CAREGIVER AND WAIT POINT FOR AUTONOMOUS DRIVING VEHICLE | CAREGIVER(*) AND RELIEF AUTONOMOUS DRIVING VEHICLE MOVE TO STOP LOCATION, AND PASSENGER TRANSFER TO RELIEF VEHICLE WITH ASSISTANCE OF CAREGIVER [LEVEL 3] | OPERATOR |
| PERSON REQUIRING CARE | POINT HAVING SPACE FOR ASSISTANCE FOR EXAMPLE, PARKING OF REST AREA, NEXT BUS STOP IF SUBJECT VEHICLE IS UNMANNED BUS | MULTIPLE CAREGIVERS(*) AND RELIEF AUTONOMOUS DRIVING VEHICLE MOVE TO STOP LOCATION, AND PASSENGER TRANSFER TO RELIEF VEHICLE WITH ASSISTANCE OF CAREGIVERS [LEVEL 4] | OPERATOR |
| NO PASSENGER | CLOSE TO PUBLIC TRANSPORTATION (FOR EXAMPLE, STATION) SO THAT DRIVER CAN MOVE TO PARK LOCATION | DRIVER MOVE TO STOP LOCATION, AND PICK UP SUBJECT VEHICLE BY MANUAL DRIVING [LEVEL 1] | UNNECESSARY |

※ ALSO SERVE AS DRIVER FOR PICKING UP SUBJECT VEHICLE BY MANUAL DRIVING

VEHICLE CONTROL SYSTEM AND VEHICLE CONTROL DEVICE

CROSS REFERENCE TO RELATED APPLICATIONS

The present application is a continuation application of International Patent Application No. PCT/JP2019/028509 filed on Jul. 19, 2019, which designated the U.S. and claims the benefit of priority from Japanese Patent Application No. 2018-137826 filed on Jul. 23, 2018. The entire disclosures of all of the above applications are incorporated herein by reference.

TECHNICAL FIELD

The present disclosure relates to a vehicle control system and a vehicle control device each of which controls an autonomous driving vehicle.

BACKGROUND

A technique for setting a safe stop position for an autonomous driving vehicle and causing the autonomous driving vehicle to stop at the position when a fault occurs in the autonomous driving vehicle has been proposed.

SUMMARY

The present disclosure provides a vehicle control system that includes a vehicle control device. When inappropriate information is received, the vehicle control device is configured to set a second stop position for stopping an autonomous driving vehicle as a target vehicle. The vehicle control device is configured to transmit at least position information of the target vehicle to a center device and acquire a first stop position.

BRIEF DESCRIPTION OF DRAWINGS

The features and advantages of the present disclosure will become more apparent from the following detailed description made with reference to the accompanying drawings. In the drawings:

FIG. 4 is a diagram showing an example of a relationship between types of passengers and measure methods.

DETAILED DESCRIPTION

Figure 1:
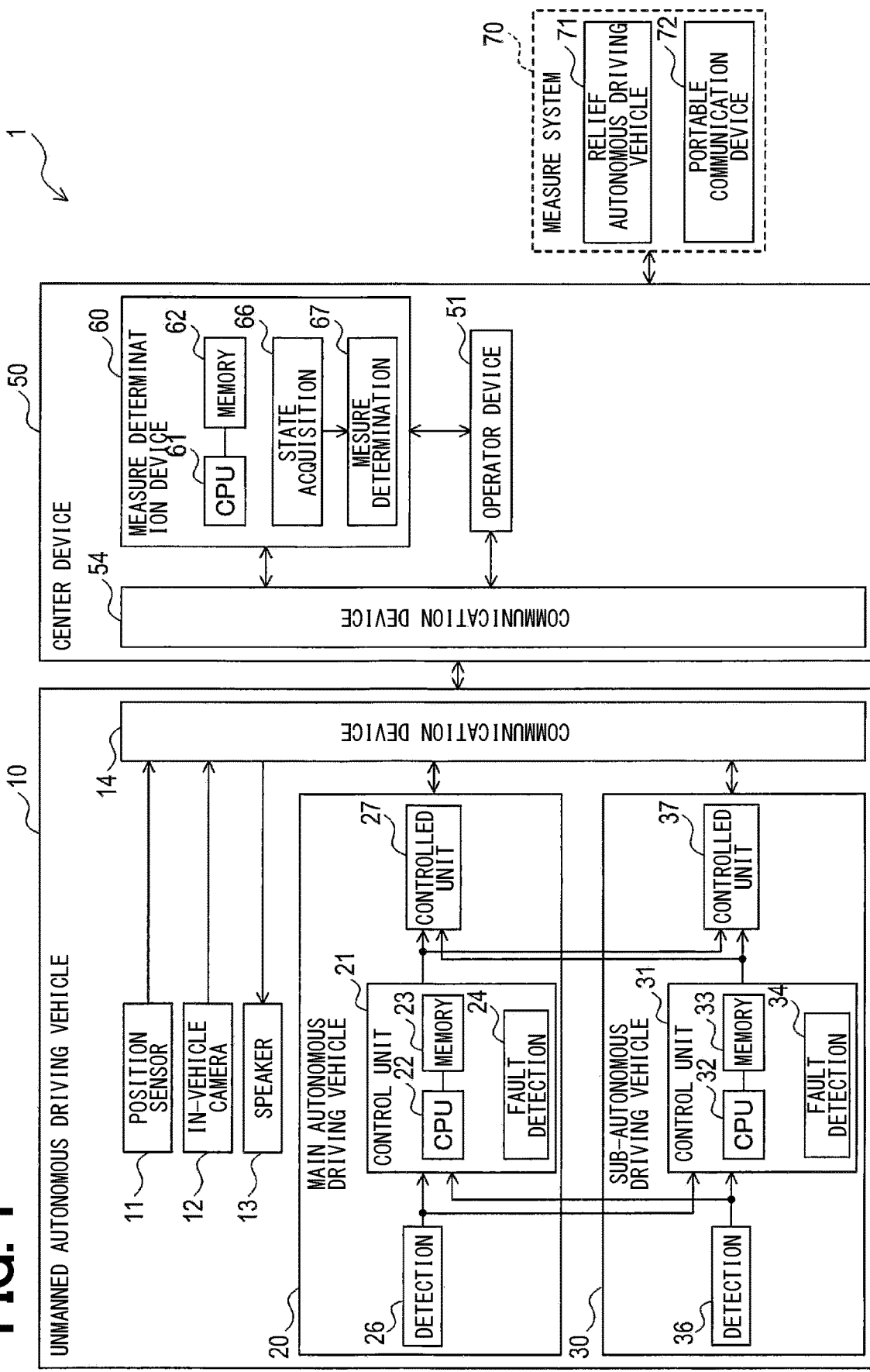
FIG. 1 is a block diagram showing a configuration of a vehicle control system.

For example, simply setting a stop position for an autonomous driving vehicle does not take a circumstance for those who provides relief for the failed autonomous driving vehicle into consideration. Thus, an inappropriate stop position for relief may be set.

The present disclosure to provide a vehicle control system and a vehicle control device configured to control an autonomous driving vehicle. Each of the vehicle control system and the vehicle control device can maintain safety and appropriately provide relief to a failed autonomous driving vehicle.

An exemplary embodiment of the present disclosure provides a vehicle control system that includes a vehicle control device and a center device. The vehicle control device controls traveling of an autonomous driving vehicle. The center device communicates with the vehicle control device. The center device includes a termination recognition unit and a first setting unit. The termination recognition unit recognizes that the autonomous driving vehicle terminates autonomous driving. The first setting unit (i) sets, when the termination recognition unit recognizes that the autonomous driving vehicle terminates the autonomous driving, a first stop position for stopping the autonomous driving vehicle as a target vehicle based on position information transmitted from the target vehicle that indicates the autonomous driving vehicle to terminate the autonomous driving and map information previously prepared and (ii) transmits the first stop position to the target vehicle. The vehicle control device includes an inappropriateness reception unit, a second setting unit, a stop acquisition unit, and a stop control unit. The inappropriateness reception unit receives inappropriate information indicating that the autonomous driving is inappropriate for the autonomous driving vehicle. The second setting unit sets a second stop position for stopping the autonomous driving vehicle as the target vehicle. The stop acquisition unit transmits at least the position information of the target vehicle to the center device and acquire the first stop position. The stop control unit causes the target vehicle to head to the second stop position and, in response to acquiring the first stop position, causes the target vehicle to head to the first stop position.

In the exemplary embodiment of the present disclosure, when the first stop position set by the center device can be acquired, the autonomous driving vehicle can stop at the first stop position. When the first stop position set by the center device cannot be acquired, the autonomous driving vehicle can stop at the second stop position. Therefore, the stop position of the autonomous driving vehicle can be changed at the convenience of the manager who manages the center device, that is, the person who provides relief.

As a result, the autonomous driving vehicle can be stopped at a stop position suitable for relief. On the other hand, even when the first stop position set by the center device cannot be obtained, such as when the communication between the autonomous driving vehicle and the center device is interrupted, the vehicle control device can cause the vehicle to stop at the second stop position which is autonomously set by the vehicle control device. Thus, the configuration can control the autonomous driving vehicle more safely.

Embodiments of the present disclosure will be described below with reference to the drawings.

(1-1. Configuration)

A vehicle control system 1 shown in FIG. 1 includes one or more unmanned autonomous driving vehicles 10 and a center device 50. The unmanned autonomous driving vehicle 10 is an autonomous driving vehicle that has a function of autonomous driving, that is, a function of autonomously traveling the vehicle without requiring operation of the driver. Although one unmanned autonomous driving vehicle 10 is shown in FIG. 1, a plurality of unmanned autonomous driving vehicles having the similar configuration may be provided. Further, the vehicle control system 1 may include a measure system 70.

The unmanned autonomous driving vehicle 10 may be provided as a taxi that transports a passenger with being unmanned. The unmanned autonomous driving vehicle 10 has the function of performing autonomous driving, but is also manually driven by the operation of the driver. The unmanned autonomous driving vehicle 10 may be a vehicle other than the taxi, for example, a bus, a passenger car, or the like.

The unmanned autonomous driving vehicle 10 includes a position sensor 11, an in-vehicle camera 12, a speaker 13, a communication device 14, and a plurality of autonomous driving devices 20 and 30. The position sensor 11 includes a receiver of a well-known global positioning system, an acceleration sensor, a yaw rate sensor, and the like. The position sensor 11 recognizes the position of the unmanned autonomous driving vehicle 10 on the earth. The position of the unmanned autonomous driving vehicle 10 is transmitted to the autonomous driving devices 20 and 30.

The in-vehicle camera 12 is a well-known camera that images the vehicle compartment of the unmanned autonomous driving vehicle 10. The in-vehicle camera 12 is provided with a microphone. The in-vehicle camera 12 captures a face of passenger such as a taxi customer in the vehicle compartment. The captured image is transmitted to the center device 50 via the autonomous driving devices 20 and 30 together with the sound captured by the microphone.

The speaker 13 is a well-known speaker, and output sound transmitted from the center device 50 at the time of dialogue with the center device 50. The communication device 14 is provided as a communication module. The communication device 14 has a function of connecting the position sensor 11, the in-vehicle camera 12, the speaker 13, and the plurality of autonomous driving devices 20 and 30 so as to be able to communicate with each other. The communication device 14 also has a function of performing wireless communication using a mobile phone network with the center device 50. The in-vehicle camera 12, the speaker 13, the communication device 14, or the like may be provide by a device that is capable of being retrofitted to the vehicle such as a tablet terminal.

One of the plurality of autonomous driving devices 20 includes a control unit 21, a detection unit 26, and a controlled unit 27, and the other one of the plurality of autonomous driving devices 30 similarly includes a control unit 31, a detection unit 36 and a controlled unit 37.

Each of the detection units 26 and 36 is provide by a well-known sensor that recognizes a surrounding condition necessary for autonomous driving, such as another vehicle, an obstacle, or a lane. The detection results recognized by the detection units 26 and 36 are transmitted to the control units 21 and 31 of the autonomous driving devices 20 and 30, respectively.

The controlled units 27 and 37 cause the unmanned autonomous driving vehicle 10 to travel, steer, or brake. Each of the controlled units 27 and 37 may be provided by an actuator, such as a motor, an engine, or a pump. The controlled units 27 and 37 receive drive commands from the control units 21 and 31 of the autonomous driving devices 20 and 30, respectively. In the present embodiment, one of the plurality of autonomous driving devices 20 is provided as a main control device, and the other one of the plurality of autonomous driving devices 30 is provided as a sub control device. Therefore, when there is no fault in the autonomous driving devices 20 and 30 and the controlled units 27 and 37 respectively receive the drive commands from the control units 21 and 31, the command transmitted from the control unit 21, which is the main control device, is prioritized.

The control units 21 and 31 respectively include CPUs 22 and 32 and microcomputers each having a semiconductor memory (hereinafter, memory 23 and 33) such as RAM or ROM. Functions provided by the control units 21 and 31 are respectively implemented by the CPUs 22 and 32 executing programs stored in the non-transitory tangible storage mediums. In this example, each of the memories 23 and 33 corresponds to the non-transitory tangible storage medium that stores the program. When the program is executed, a method corresponding to the program is executed. The non-transitory tangible storage medium represents storage medium exclusive of electromagnetic waves. Each of the control units 21 and 31 and a measure determination device 60 described later may include one microcomputer or multiple microcomputers.

As shown in FIG. 1, the control units 21 and 31 respectively include fault detection units 24 and 34. The technique for realizing the functions of each unit included in each of the control units 21 and 31 and a measure determination device 60 is not limited to software, and some or all of the functions may be realized using one or more hardware. For example, when the above-described functions may be implemented by an electronic circuit which is hardware, the electronic circuit may be implemented by a digital circuit, an analog circuit, or a combination thereof.

The function of each of the fault detection units 24 and 34 recognizes a fault of the device used for autonomous driving or a temporarily unusable state of the device. In the present embodiment, the fault of the device used for autonomous driving includes a fault of any configuration of any one of the autonomous driving devices 20 and 30. Specifically, the fault of the device used for autonomous driving includes a fault of the control unit 21 or 31, the detection unit 26 or 36, or the controlled unit 27 or 37.

The fault of the device used for autonomous driving is capable of being recognized by monitoring an operation state of a signal transmitted from each device. The temporarily unusable state of the device may include a case where a foreign substance adheres to the sensor, a case where object detection performance is significantly deteriorated due to the weather, or a case where fail-safe is performed under extremely high temperature or extremely low temperature. The temporarily unusable state of the device is capable of being recognized by monitoring an operation state of a signal transmitted from each device.

In addition to the functions of the fault detection units 24 and 34, the plurality of autonomous driving devices 20 and 30 perform autonomous driving for the unmanned autonomous driving vehicle 10. The autonomous driving is an operation performed by each of the autonomous driving devices 20 and 30, and move the unmanned autonomous driving vehicle 10 without passenger's operation to the predetermined destination using map data prepared in advance in the memory 23 or 33, another vehicle recognized by the detection unit 26 or 36, or a peripheral object such as lane, or the like.

Each of the plurality of autonomous driving devices 20 and 30 has a function of performing autonomous driving independently, but the autonomous driving function is made redundant so that the autonomous driving can be continued even when any of the autonomous driving devices 20 and 30 fails. That is, by multiplexing the autonomous driving devices 20 and 30, it is possible to safely continue the autonomous driving in the event of a fault. In consideration of the possibility that both the autonomous driving devices 20 and 30 fail and the autonomous driving devices 20 and 30 do not function, the time to continue the autonomous driving when any of the autonomous driving devices 20 and 30 fails is limited to several tens of minutes.

Therefore, in the configuration of the present embodiment, when any of the autonomous driving devices 20 and 30 fails, the destination is set to a closer safe stop position and the unmanned autonomous driving vehicle 10 is stopped at the stop position. The operation at this time will be described later.

Next, the center device 50 is a device having a function of managing the positions of one or a plurality of unmanned autonomous driving vehicles 10 and a function of transmitting an instruction to the unmanned autonomous driving vehicle 10. The center device 50 includes a measure determination device 60, an operator device 51, and a communication device 54.

The operator device 51 is a device operated by an operator to communicate with the passenger of the target vehicle. The target vehicle represents a vehicle to be relieved among one or a plurality of unmanned autonomous driving vehicles 10 managed by the center device 50. The operator device 51 includes a communication device such as a headset, an input device such as a keyboard, and a display device such as a display. The operator device 51 enables the operator to talk with the passenger of the target vehicle via the communication device 54, and is capable of setting the first stop position and the measure method described later via the input device.

The communication device 54 is provided as a communication module having a function of performing wireless communication between the measure determination device 60 and the unmanned autonomous driving vehicle 10 and between the operator device 51 and the unmanned autonomous driving vehicle 10.

The measure determination device 60 includes a microcomputer having a CPU 61 and a semiconductor memory (hereinafter, a memory 62) such as RAM or ROM. Each function of the measure determination device 60 is executed by the CPU 61 for executing a program stored in a non-transitory tangible storage medium. In this example, the memory 62 corresponds to the non-transitory tangible storage medium for storing a program. When the program is executed, a method corresponding to the program is executed.

As shown in FIG. 1, the measure determination device 60 includes a function of a state acquisition unit 66 and a function of a measure determination unit 67.

The state acquisition unit 66 acquires a state of the unmanned autonomous driving vehicle 10 such as a traveling state or the presence or absence of fault. The measure determination unit 67 sets a relief method according to the type of the passenger in the target vehicle. Here, the memory 62 or the like of the measure determination device 60 inputs data related to the type of the passenger in advance when the passenger reserves a taxi. That is, the memory 62 or the like of the measure determination device 60 inputs information on the age of the passenger and whether or not the passenger is a person requiring care at the time of making a reservation for the unmanned autonomous driving vehicle 10.

The measure system 70 is a device heading for relief when the unmanned autonomous driving vehicle 10 stops due to a trouble such as a breakdown. The measure system 70 includes a relief autonomous driving vehicle 71 and a portable communication device 72.

The relief autonomous driving vehicle 71 has the similar configuration to the above-mentioned unmanned autonomous driving vehicle 10, and heads to the stop position at which the unmanned autonomous driving vehicle 10 stops due to a trouble in response to an instruction from the center device 50. The portable communication device 72 is a communication device such as a smartphone, a tablet terminal, or the like possessed by a person who provides relief when performing the relief. The portable communication device 72 is instructed by the center device 50 to head to the stop position of the unmanned autonomous driving vehicle 10 that stops due to a trouble.

(1-2. Processing)

Figure 2:
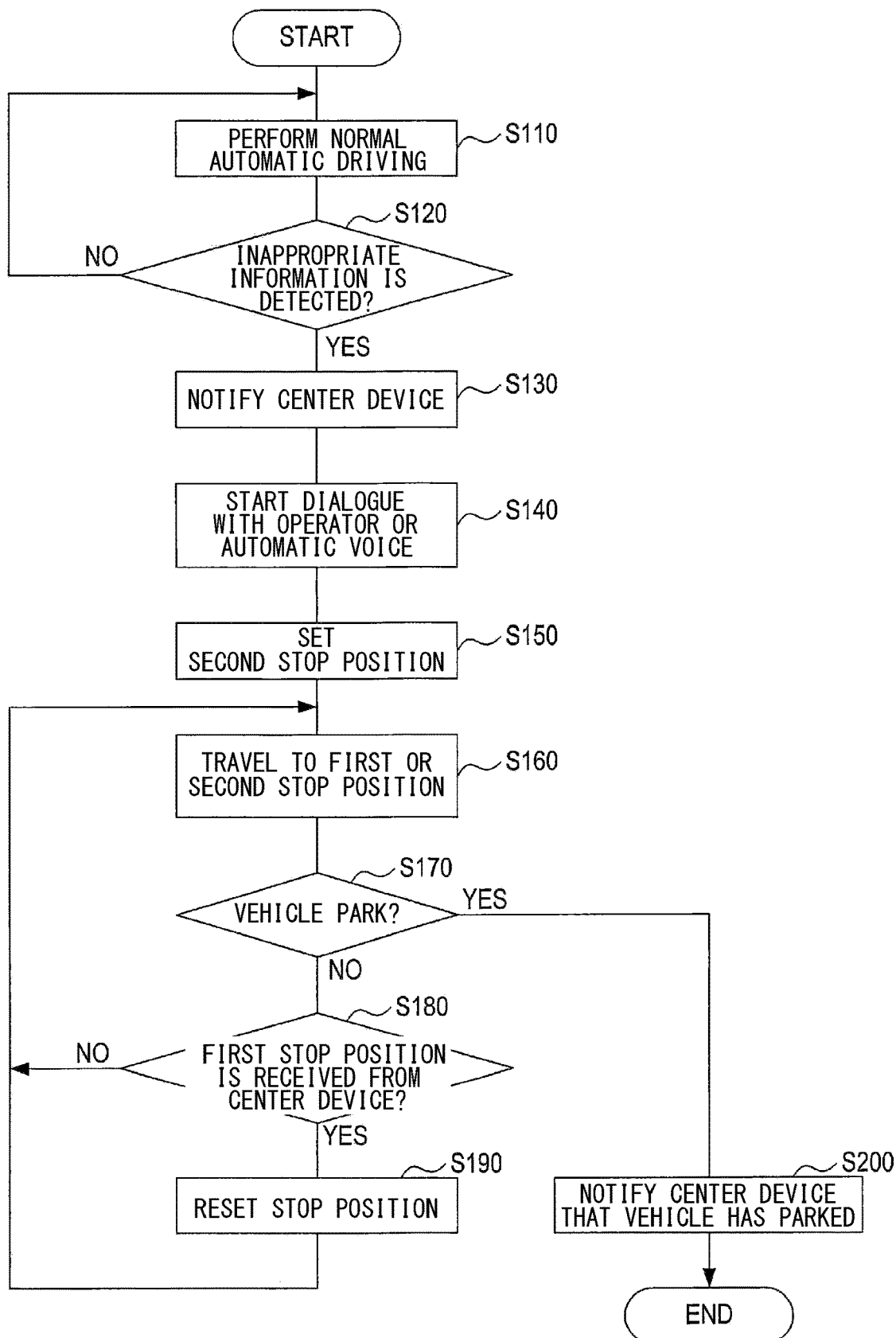
FIG. 2 is a flowchart showing vehicle processing.

Next, the processing executed by the autonomous driving device 20, 30 will be described with reference to the flowchart of FIG. 2. This processing starts when an instruction to start autonomous driving is input from the center device 50 or the like to the autonomous driving device 20, 30. The processing stops in the autonomous driving device 20, 30 which fails.

In the vehicle processing, first, in S110, the autonomous driving device 20, 30 performs normal autonomous driving. The normal autonomous driving indicates an operation in which the unmanned autonomous driving vehicle 10 moves to the destination that is preset and desired by the passenger without requiring the operation of the passenger.

Subsequently, in S120, the autonomous driving device 20, 30 determines whether inappropriate information has been detected. The inappropriate information indicates information that performing the autonomous driving is inappropriate. The inappropriate information includes the fault of the device used for autonomous driving, the temporarily unusable state of the device, a preset operation such as push of an emergency button in the vehicle, or the like.

When the autonomous driving device 20, 30 determines that the inappropriate information has not been detected in S120, the processing returns to S110. On the other hand, when the autonomous driving device 20, 30 determines that the inappropriate information has been detected in S120, the processing proceeds to S130. In S130, the autonomous driving device 20, 30 notifies the center device 50.

The information notified to the center device 50 includes at least the inappropriate information and the position of the unmanned autonomous driving vehicle 10 detected by the position sensor 11. In the present embodiment, the information also includes a traveling speed and an image captured by the in-vehicle camera 12.

Subsequently, in S140, the autonomous driving device 20, 30 starts a dialogue between the operator and the passenger or a dialogue between an automatic voice and the passenger. The dialogue with the passenger starts in response to a request from the center device 50 described later.

Subsequently, in S150, the autonomous driving device 20, 30 sets a second stop position. A first stop position is set by the center device 50. The second stop position is a stop position set by the autonomous driving device 20, 30, and is set to, for example, a preset position as the nearest safe position. The safe position corresponds to a position on the road which is located outside the lane on which another vehicle is traveling and is a position relatively unlikely to collide with another traveling vehicle. The safe position may include a rest area, a parking area, a parking lot of a public facility, a bus stop, an emergency parking zone, a road shoulder having a width equal to or larger than the width of the subject vehicle, or the like.

Subsequently, in S160, the autonomous driving device 20, 30 causes the subject vehicle to head to the first stop position or the second stop position.

Here, the unmanned autonomous driving vehicle 10 is driven in the same manner as the normal autonomous driving, but the destination is not the destination desired by the passenger but the second stop position set in S150. When the first stop position is assigned by the center device 50 in S190 described later, the destination is set to the first stop position and the autonomous driving is performed. That is, the stop position of the subject vehicle can be changed at the convenience of the manager of the center device 50, in other words, the person who provides the relief, such as a taxi company, a bus company, or a security company.

Subsequently, in S170, the autonomous driving device 20, 30 determines whether the unmanned autonomous driving vehicle 10 has stopped at the set stop position. For example, the autonomous driving device 20, 30 determines that the unmanned autonomous driving vehicle 10 has stopped at the set stop position when the error of the position between the unmanned autonomous driving vehicle 10 and the set stop position is less than the preset distance and the speed of the unmanned autonomous vehicle 10 is approximately 0.

When the autonomous driving device 20, 30 determines that the unmanned autonomous driving vehicle 10 has not stopped in S170, the processing proceeds to S180. In S180, the autonomous driving device 20, 30 determines whether the information that the center device 50 assigns the first stop position is received. When the autonomous driving device 20, 30 determines in S180 that the information that the center device 50 assigns the first stop position is not received, the processing returns to S160.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

On the other hand, the autonomous driving device 20, 30 determines in S180 that the information that the center device 50 assigns the first stop position is received, the processing proceeds to S190 and the autonomous driving device 20, 30 resets the destination to the received first stop position. That is, the autonomous driving device 20, 30 discards the second stop position set by the unmanned autonomous driving vehicle 10, and sets the first stop position set by the center device 50. Thereafter, the processing returns to S160.

On the other hand, when the autonomous driving device 20, 30 determines in S170 that the autonomous driving vehicle 10 has stopped, the processing proceeds to S200. The autonomous driving device 20, 30 notifies the center device 50 that the autonomous driving vehicle 10 has stopped. The center device 50 transmits the information that the autonomous driving vehicle 10 arrives at the stop position, that is, the first stop position or the second stop position to each device constituting the measure system 70.

Then, each device constituting the measure system 70 can recognize that the unmanned autonomous driving vehicle 10 has arrived at the stop position and the position of the unmanned autonomous driving vehicle 10. Upon completion of such processes, the vehicle processing in FIG. 2 is terminated.

Figure 3:
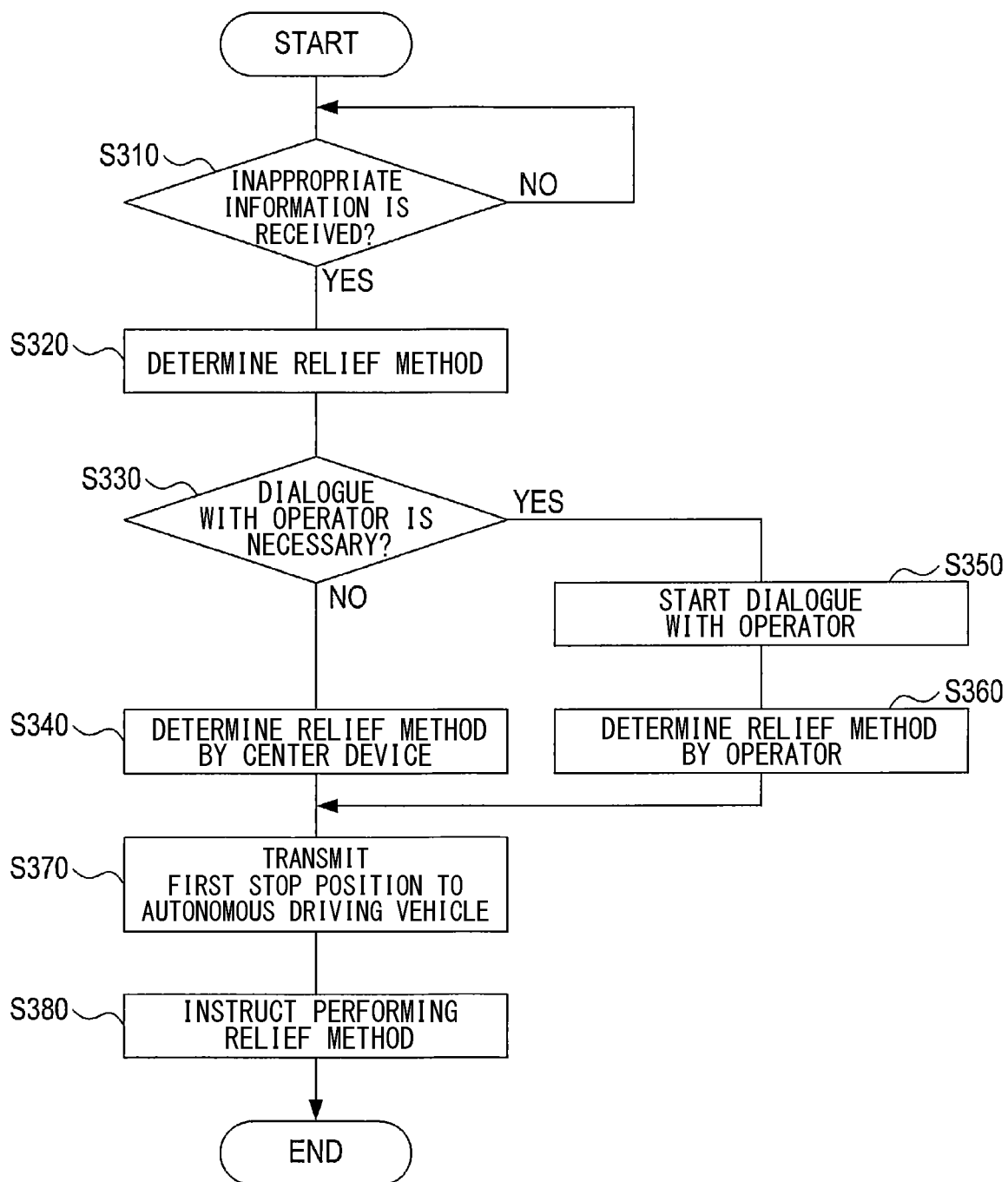
FIG. 3 is a flowchart showing center processing.

Next, center processing executed by the measure determination device 60 will be described with reference to the flowchart of FIG. 3. The center processing is executed for each unmanned autonomous driving vehicle 10 managed by the center device 50.

In the center processing, first, in S310, the measure determination device 60 determines whether the inappropriate information is received from the unmanned autonomous driving vehicle 10. The inappropriate information is included in the information notified to the center device 50 transmitted in S130. The inappropriate information indicates that the autonomous driving is inappropriate as described above. After the inappropriate information is transmitted, the autonomous driving by the unmanned autonomous driving vehicle 10 is terminated. Thus, the inappropriate information also indicates that the autonomous driving by the unmanned autonomous driving vehicle 10 is terminated.

When the measure determination device 60 determines that the inappropriate information has not been received in S310, the processing returns to S310. On the other hand, when the measure determination device 60 determines that the inappropriate information has been received in S310, the measure determination device 60 proceeds to S320 and determines the relief method.

Here, the unmanned autonomous driving vehicle 10 in which the fault has occurred is defined as a target vehicle to be relieved, and the type of the passenger of the target vehicle is recognized. Then, the relief method is set according to the type of the passenger.

The type of the passenger is divided based on the degree of assistance required for the relief to the passenger. In the present embodiment, the type of the passenger is divided into an adult person not requiring care, a small child, a person requiring care according to the degree of assistance to be required.

The passenger type may be recognized by processing the image captured by the in-vehicle camera 12 of the target vehicle, or by using the data indicating the passenger type recorded in advance in the memory 62 or the like of the measure determination device 60.

Here, as shown in FIG. 4, a table in which the type of the passenger and the relief method are associated with each other is recorded in the memory 62 of the measure determination device 60 in advance. The relief method indicates how to provide the relief. In the table shown in FIG. 4, the stop position, the measure method, and the dialogue method with the passenger are determined as the relief method. In particular, the measure method includes dispatch mode of the person who provides the relief, that is, the number of supporters and the like. The relief method may include other information such as the need for a care vehicle.

Subsequently, in S330, the measure determination device 60 determines whether dialogue with the operator is necessary based on the table shown in FIG. 4. Here, when the type of the passenger is an adult not requiring care, the measure determination device 60 sets to respond by automatic voice. When the type of the passenger is a small child or a person requiring care, the measure determination device 60 sets dialogue by an operator. When there is no passenger, the measure determination device 60 determines that no dialogue is necessary.

When the measure determination device 60 determines in S330 that dialogue with the operator is not necessary, the processing proceeds to S340. In S340, the center device 50 determines the relief method. The center device 50 requests the passenger's consent for the first stop position and the measure method as determined below by an automatic voice dialogue. When the consent is obtained, the center device 50 sets the first stop position and the measure method.

The first stop position set by the center device 50 is a position that is preset as a safe position based on the position information transmitted from the target vehicle and the map information prepared in advance in the memory 62 or the like. The concept of the first safe position is the same as that of the second stop position.

The first stop position and the measure method are set according to the policy shown in FIG. 4.

When the type of the passenger is an adult not requiring care, the relief autonomous driving vehicle 71 is sent to the first stop position and the passenger transfers to the relief autonomous driving vehicle 71 by himself or herself. That is, when the relief autonomous driving vehicle 71 picks up the passenger at the first stop position, the destination of the relief autonomous driving vehicle 71 is sets at the destination that is set in the target vehicle and desired by the passenger, and delivers the passenger to the destination. It is necessary to direct a driver to the first stop position separately and transmit an instruction to manually collect the target vehicle.

When the type of the passenger is an adult requiring no care, the degree of measure is [Level 2]. In [Level 2], a person who collects the target vehicle is required but no person who assists the transfer of the passenger is required. [Level 2] is a measure method that includes relatively light burden for the relief.

When the type of the passenger is an adult requiring no care, the first stop position is set at a temporal intermediate point between the present position of the target vehicle and the present position of the relief autonomous driving vehicle 71 to deal with. More precisely, the first stop position is set to the safe position closest to this temporal intermediate point. The temporal intermediate point is a point where the relief autonomous driving vehicle 71 and the target vehicle are expected to arrive at the same time, taking the average traveling speed for the road prepared in advance, the traveling speed due to traffic congestion, and the like into consideration.

Next, when the type of the passenger is a small child, the relief autonomous driving vehicle 71 and one caregiver are sent to the first stop position and the passenger transfers to the relief autonomous driving vehicle 71 with assistance of the caregiver. In this case, the passenger is delivered to the destination in the similar manner when the type of the passenger is an adult requiring no care.

When the type of the passenger is a small child, the degree of measure is [Level 3]. In [Level 3], sending of a caregiver is required. Thus, [Level 3] is a measure method that includes relatively heavy burden for the relief.

When the type of the passenger is a small child, the first stop position is set at a temporal intermediate point among the present position of the target vehicle, the present position of the caregiver to take care of the passenger, and the present position of the relief autonomous driving vehicle 71 to deal with. The temporal intermediate point takes the time for the relief autonomous driving vehicle 71 to ride the caretaker into consideration.

Next, when the type of the passenger is a person requiring care, the relief autonomous driving vehicle 71 and multiple caregivers are sent to the first stop position and the passenger transfers to the relief autonomous driving vehicle 71 with support of the caregivers. In this case, the passenger is delivered to the destination in the similar manner when the type of the passenger is an adult requiring no care.

When the type of the passenger is a person requiring care, the degree of measure is [Level 4]. In [Level 4], sending of multiple caregivers is required. Thus, [Level 4] is a measure method that includes highest burden for the relief.

When the type of the passenger is a person requiring care, the first stop position is set at a temporal intermediate point among the present position of the target vehicle, the present positions of the caregivers to take care of the passenger, and the present position of the relief autonomous driving vehicle 71 to deal with. The temporal intermediate point takes the time for the relief autonomous driving vehicle 71 to ride the caretakers into consideration. In addition, the position where space for assistance can be secured is set as the safe position. For example, among the safe positions, a position whose road shoulder has no space more than twice the width of the relief autonomous driving vehicle 71 may be excluded.

Next, when the type of the passenger is unoccupied, that is, nobody rides the target vehicle, the measure method sets a method of directing the driver to the first stop position and manually collecting the target vehicle.

When the type of the passenger is no passenger, the first stop position that is a position with high convenience for taking public transportation is set in order for the driver to move to the first stop position on foot and by public transportation. The position with high convenience for taking public transportation may indicate a position within a 10-minute walk from a station or a bus stop.

When the type of the passenger is no passenger, the degree of measure is [Level 1]. In [Level 1], a person who collects the target vehicle is required but no transfer is required. Thus, [Level 1] is a measure method that includes lightest burden for the relief.

As described above, the first stop position and the measure method are basically set according to the above policy, but when the passenger's consent is not obtained, such as when the passenger requests to stop immediately, the first stop position may be changed regardless of the policy shown in FIG. 4. In addition, when the number of caregivers and drivers to provide relief is insufficient, the measure method can be changed regardless of the policy shown in FIG. 4.

When the first stop position is changed as described above, the changed first stop position may be set at an arbitrary position between the present position of the relief vehicle and the present position of the target vehicle.

When the measure method is changed, the measure method of [Level 4] may be changed to [Level 3] or the measure method of [Level 3] may be changed to [Level 2] according to the number of caregivers who can deal with. Further, for example, the measure method of [Level 2] may be changed to [Level 3] according to the request of the passenger.

After S340, the processing proceeds to S370, which will be described later.

When the measure determination device 60 determines in S330 that a dialogue with the operator is necessary, the processing proceeds to S350 and starts a dialogue between the passenger and the operator. In this process, when the operator specifies the target vehicle to the operator device 51 and performs an operation to start the call, a request for dialogue is transmitted to the target vehicle and the call starts.

Subsequently, in S360, in the measurement determination device 60, the operator determines the relief method. The operator determines the first stop position and the measure method according to the result of the dialogue. The first stop position and the measure method are determined according to the policy shown in FIG. 4 as described above, but the operator can arbitrarily change the first stop position and the measure method.

Subsequently, in S370, the measure determination device 60 transmits the first stop position to the target vehicle among the autonomous driving vehicles 10. Subsequently, in S380, the measure determination device 60 instructs the implementation of the relief method, and then the center processing in FIG. 3 is terminated.

Each device of the measure system 70 is instructed of information for identifying the target vehicle such as a license plate, the first stop position where the target vehicle stops, and the measure method. When the relief autonomous driving vehicle 71 is instructed and the caregiver will not be on board, the relief autonomous driving vehicle 71 is immediately dispatched to the first stop position. In addition, when a caregiver gets on board, the relief autonomous driving vehicle 71 waits for the caregiver getting on board and then is dispatched.

When the instruction is given to the portable communication device 72, the instruction content is displayed on the display unit of the portable communication device 72. The person who possesses the portable communication device 72 heads to the first stop position according to the instruction contents and takes the measure.

(1-3. Effects)

According to the first embodiment detailed above, the following effects may be obtained.

(1a) The present disclosure provides a vehicle control system 1 having the autonomous driving device 20 and 30 configured to control traveling of the autonomous driving vehicle and the center device 50 configured to communicate with the autonomous driving device 20 and 30. The measure determination device 60 of the center device 50 is configured in S310 to recognize that the autonomous driving vehicle terminates the autonomous driving. After recognizing that the autonomous driving vehicle terminates the autonomous driving, the measure determination device 60 of the center device 50 is configured in S340 to S370 to set the first stop position at which the target vehicle, which indicates the autonomous driving vehicle terminating the autonomous driving vehicle, stops based on the position information transmitted from the target vehicle the map information prepared in advance, and transmit the first stop position to the target vehicle.

The autonomous driving devices 20 and 30 are configured in S120 to receive the inappropriate information indicating the autonomous driving by the autonomous driving device is inappropriate or the information that a preset operation is performed such as push of an emergency button in the vehicle.

When receiving the inappropriate information, the autonomous driving devices 20 and 30 are configured in S150 to set the second stop position indicating the position for stopping the target vehicle as the autonomous driving vehicle. The autonomous driving devices 20 and 30 are configured in S130, S180 to transmit at least the position information of the target vehicle to the center device 50 and acquire the first stop position.

The autonomous driving devices 20 and 30 configured in S160, S190 to cause the target vehicle to head to the second stop position. The autonomous driving devices 20 and 30 configured to cause the target vehicle to head to the first stop position when the first stop position is acquired.

According to the configuration described above, when the first stop position set by the center device 50 can be acquired, the autonomous driving vehicle can stop at the first stop position. When the first stop position set by the center device 50 cannot be acquired, the autonomous driving vehicle can stop at the second stop position. Therefore, the stop position of the autonomous driving vehicle can be changed at the convenience of the manager who manages the center device 50, that is, the person who provides relief.

As a result, the autonomous driving vehicle can be stopped at a stop position suitable for relief. On the other hand, even when the first stop position set by the center device 50 cannot be obtained, such as when the communication between the autonomous driving vehicle and the center device 50 is interrupted, the autonomous driving devices 20 and 30 can cause the vehicle to stop at the second stop position which is autonomously set by the devices 20 and 30. Thus, the configuration can control the autonomous driving vehicle more safely.

(1b) The measure determination device 60 is configured in S320 to acquire the type of the passenger of the target vehicle. Further, the measure determination device 60 is configured in S320 to set the relief method for the passenger according to the type of the passenger.

According to the configuration described above, when the relief is directed to the stop position of the target vehicle, the relief method can be set according to the type of the passenger.

(1c) In S320, the measure determination device 60 may set a dialogue method for communicating with the passenger according to the type of the passenger.

According to the configuration described above, the dialogue method can be set according to the type of the passenger. For example, the dialogue with the operator, the dialogue with the automatic voice, the dialogue with the AI, and the like can be selected. In this case, when the passenger is a child, it is possible to give the passenger a sense of security through dialogue with the operator. When the passenger is an adult not requiring care, the operator's labor costs can be reduced by using automatic voice or the like.

(1d) The measure determination device 60 may be configured in S320 to output an instruction so that the relief vehicle heads to the first stop position. Further, the measure determination device 60 may set the first stop position at a position intermediate between the present position of the relief vehicle and the present position of the target vehicle in S340 to S370.

According to the configuration described above, since the stop position of the target vehicle is set at a position intermediate between the present position of the relief vehicle and the present position of the target vehicle, the time until the relief vehicle arrives at the target vehicle can be shortened.

(1e) The measure determination device 60 may set the first stop position in S340 to S370 at a temporal intermediate point between the present position of the relief vehicle and the present position of the target vehicle.

According to the configuration described above, the stop position of the target vehicle is set at the time intermediate point between the present position of the relief vehicle and the present position of the target vehicle. The configuration can minimize the time from the stop of the target vehicle to the arrival of the relief vehicle.

(1f) When a person requiring care is included in the type of the passenger, the measure determination device 60 may set in S340 to S370 the first stop position at a predetermined position having space necessary for care.

According to the configuration described above, when a person requiring care transfers to another vehicle such as the relieve vehicle, it is possible to easily secure the space required for care.

2. Other Embodiments

Although the embodiments of the present disclosure have been described above, the present disclosure is not limited to the embodiments described above, and various modifications can be made to implement the present disclosure.

(2a) In the present embodiment, it is recognized that the unmanned autonomous driving vehicle 10 terminates the autonomous driving by receiving the inappropriate information from the unmanned autonomous driving vehicle 10.

However, the present invention is not limited to thereto. For example, it may be recognized that the unmanned autonomous driving vehicle 10 terminates the autonomous driving by monitoring the traveling state such as the position and speed of the unmanned autonomous driving vehicle 10 or a state of the device each device constituting the unmanned autonomous driving vehicle 10.

(2b) In the above embodiment, a taxi is applied to the unmanned autonomous driving vehicle 10, but a bus, a passenger car, or the like may be applied to the unmanned autonomous driving vehicle 10. In such a case, the capacity of the vehicle and the number of vehicles heading for relief may be set according to the number of passengers so that all passengers can board.

(2c) A plurality of functions of one element in the above embodiment may be implemented by a plurality of elements, or one function of one element may be implemented by a plurality of elements. Further, a plurality of functions of a plurality of elements may be implemented by one element, or one function implemented by a plurality of elements may be implemented by one element. A part of the configuration of the above embodiment may be omitted. At least a part of the configuration of the above embodiments may be added to or repositioned with the configuration of another one of the above embodiments.

(2d) In addition to the vehicle control system 1 described above, a component such as the vehicle control device 10 and the center device 50 constituting the vehicle control system 1, a program for making the computer function as the vehicle control system 1, a non-transitory tangible storage medium such as a semiconductor memory in which the program is stored, and a vehicle control method may be provided to realize the present disclosure.

3. Correspondence Relation Between the Configuration of the Present Embodiments and the Configuration of the Present Disclosure In the embodiment, the autonomous driving devices 20 and 30 correspond to a vehicle control device in the present disclosure. Further, among the processes executed by the autonomous driving devices 20 and 30 in the embodiment, the process of S120 corresponds to an inappropriateness reception unit in the present disclosure, and the processes of S130 and S180 in the embodiment correspond to a stop acquisition unit in the present disclosure. Further, in the embodiment, the process of S150 corresponds to a second setting unit in the present disclosure, and in the embodiment, the processes of S160 and S190 correspond to a stop control unit in the present disclosure.

Further, among the processes executed by the measure determination device 60 in the embodiment, the process of S310 corresponds to a termination recognition unit in the present disclosure, and in the embodiment, the process of S320 corresponds to a passenger acquisition unit and a relief setting unit in the present disclosure. Further, in the embodiment, the processes of S340 to S370 correspond to a first setting unit in the present disclosure.

What is claimed is:

1. A vehicle control system comprising:
a vehicle control device configured to control traveling of an autonomous driving vehicle; and
a center device configured to communicate with the vehicle control device, wherein
the center device includes at least one processor and a memory coupled to the at least one processor, configured to
recognize, based on information indicating fault of a device used for autonomous driving or information indicating temporarily unusable state of the device which are transmitted from the vehicle control device, that the autonomous driving vehicle terminates autonomous driving,
(i) set, when the at least one processor of the center device recognizes that the autonomous driving vehicle terminates the autonomous driving, a first stop position for stopping the autonomous driving vehicle based on position information transmitted from the autonomous driving vehicle and map information previously prepared and (ii) transmit the first stop position to the autonomous driving vehicle,
acquire a type of a passenger of the autonomous driving vehicle, the type of the passenger being stored in the memory of the center device before starting autonomous driving of the autonomous driving vehicle, and
set a measure method for the passenger according to the type of the passenger and set a dialogue method for dialogue with the passenger according to the type of the passenger,
the vehicle control device includes at least one processor and a memory coupled to the at least one processor, configured to
recognize a fault of an in-vehicle device used for autonomous driving in the autonomous driving vehicle or a temporarily unusable state of the in-vehicle device by monitoring an operation state of a signal transmitted from the in-vehicle device,
transmit information indicating the fault of the in-vehicle device or the temporarily unusable state of the in-vehicle device,
set a second stop position for stopping the autonomous driving vehicle, the second stop position being a nearest position to a present position of the autonomous driving vehicle and selected from a rest area, a parking area, a parking lot of a public facility, a bus stop, an emergency parking zone, and a road shoulder having a width equal to or greater than a width of the vehicle,
transmit at least the position information of the autonomous driving vehicle to the center device and acquire the first stop position,
initiate travel of the autonomous driving vehicle toward the second stop position without waiting for receiving of the first stop position transmitted from the center device, upon setting the second stop position, and
cause the autonomous driving vehicle to head to the second stop position, which has been decided by the vehicle control device placed on the autonomous driving vehicle, in a case where the first stop position is not acquired from the center device, and cause the autonomous driving vehicle to head to the first stop position in a case where the first stop position is acquired from the center device,
the center device is placed outside the autonomous driving vehicle and the vehicle control device is placed on the autonomous driving vehicle, and the center device and the vehicle control device wirelessly communicate with each other, and
the first stop position is decided by the center device and the second stop position is decided by the vehicle control device.

2. The vehicle control system according to claim 1, wherein the at least one processor of the center device outputs an instruction to a relief vehicle to head to the first stop position, and the first stop position, which is set by the at least one processor of the center device, is a position intermediate between a present position of the relief vehicle and a present position of the autonomous driving vehicle.

3. The vehicle control system according to claim 2, wherein the at least one processor of the center device sets the first stop position at a position temporally intermediate between a present position of the relief vehicle and a present position of the autonomous driving vehicle.

4. The vehicle control system according to claim 1, wherein when the type of the passenger includes a person requiring care, the at least one processor of the center device sets the first stop position at a predetermined position having space necessary for the required care.

5. The vehicle control system according to claim 2, wherein when the type of the passenger includes a person requiring care, the at least one processor of the center device sets the first stop position at a predetermined position having space necessary for the required care.

6. A vehicle control device configured to control traveling of an autonomous driving vehicle, and configured to communicate with a center device, wherein the center device includes at least one processor and a memory coupled to the at least one processor, configured to recognize, based on information indicating fault of a device used for autonomous driving or information indicating temporarily unusable state of the device which are transmitted from the vehicle control device, that the autonomous driving vehicle terminates autonomous driving, (i) set, when the at least one processor of the center device recognizes that the autonomous driving vehicle terminates the autonomous driving, a first stop position for stopping the autonomous driving vehicle based on position information transmitted from the autonomous driving vehicle and map information previously prepared and (ii) transmit the first stop position to the autonomous driving vehicle, acquire a type of a passenger of the autonomous driving vehicle, the type of the passenger being stored in the memory of the center device before starting autonomous driving of the autonomous driving vehicle, and set a measure method for the passenger according to the type of the passenger and set a dialogue method for dialogue with the passenger according to the type of the passenger, the vehicle control device includes at least one processor and a memory coupled to the at least one processor, configured to recognize a fault of an in-vehicle device used for autonomous driving in the autonomous driving vehicle or a temporarily unusable state of the in-vehicle device by monitoring an operation state of a signal transmitted from the in-vehicle device, transmit information indicating the fault of the in-vehicle device or the temporarily unusable state of the in-vehicle device, set a second stop position for stopping the autonomous driving vehicle, the second stop position being a nearest position to a present position of the autonomous driving vehicle and selected from a rest area, a parking area, a parking lot of a public facility, a bus stop, an emergency parking zone, and a road shoulder having a width equal to or greater than a width of the vehicle, transmit at least the position information of the autonomous driving vehicle to the center device and acquire the first stop position, initiate travel of the autonomous driving vehicle toward the second stop position without waiting for receiving of the first stop position transmitted from the center device, upon setting the second stop position, and cause the autonomous driving vehicle to head to the second stop position, which has been decided by the vehicle control device placed on the autonomous driving vehicle, in a case where the first stop position is not acquired from the center device, and cause the autonomous driving vehicle to head to the first stop position in a case where the first stop position is acquired from the center device, the center device is placed outside the autonomous driving vehicle and the vehicle control device is placed on the autonomous driving vehicle, and the center device and the vehicle control device wirelessly communicate with each other, and the first stop position is decided by the center device and the second stop position is decided by the vehicle control device.

7. The vehicle control device according to claim 6, wherein when the type of the passenger includes a person requiring care, the at least one processor of the center device sets the first stop position at a predetermined position having space necessary for the required care.

8. The vehicle control system according to claim 1, wherein the type of the passenger classified includes a person not requiring care, a person requiring care, and no passenger.

9. The vehicle control system according to claim 8, wherein the person not requiring care is a person who is able to transfer from the autonomous driving vehicle to another autonomous driving vehicle by himself/herself.

10. The vehicle control system according to claim 1, wherein the second stop position set by the vehicle control device is a predetermined place at which the autonomous driving vehicle is parked, and the center device decides the first stop position depending on the type of the passenger of the autonomous driving vehicle based on the position information transmitted from the autonomous driving vehicle and the map information.

11. The vehicle control system according to claim 4, wherein the required care is a physical assistance for the passenger.

12. The vehicle control system according to claim 1, wherein the vehicle control device guides the autonomous driving vehicle to the second stop position when communication between the autonomous driving vehicle and the center device is interrupted.

* * * * *